United States Patent [19]

Confer et al.

[11] Patent Number: 4,965,914
[45] Date of Patent: Oct. 30, 1990

[54] OVERCENTER CLAMP

[75] Inventors: Keith A. Confer, Holly; Michael E. Rasmussen, Grand Blanc, both of Mich.

[73] Assignee: General Motors Corporation, Detroit, Mich.

[21] Appl. No.: 483,203

[22] Filed: Feb. 21, 1990

[51] Int. Cl.⁵ .............................................. F16L 23/00
[52] U.S. Cl. .......................................... 24/270; 24/273
[58] Field of Search ................ 24/270, 273, 530, 573, 24/71 SK; 285/409

[56] References Cited

U.S. PATENT DOCUMENTS

| | | | |
|---|---|---|---|
| 1,912,114 | 5/1933 | Allen | 24/270 |
| 4,272,871 | 6/1981 | Weinhold | 24/270 |
| 4,511,164 | 4/1985 | Orchard | 24/270 |
| 4,639,979 | 2/1987 | Polson | 285/409 |
| 4,660,870 | 4/1987 | Donley | 24/273 |

Primary Examiner—Victor N. Sakran
Attorney, Agent, or Firm—Gordon F. Belcher

[57] ABSTRACT

An overcenter clamp comprises a flexible band having a hinge end and a hooked end. The hooked end is adapted to grasp a margin of a first member. The overcenter clamp further comprises a lever arm hingedly connected to the hinge end. The lever arm has a handle and a pivot link. The pivot link has an end adapted for insertion into a socket in a second member. This enables the first and second members to be clamped together by grasping the margin with the hooked end, inserting the pivot link into the socket, and rotating the handle away from the band to a point wherein the band is tensioned and bears upon the second member. The overcenter clamp includes a retainer connected to the band adjacent the hinge end. The retainer is engageable with the lever arm to resist rotation of the lever arm with respect to the band when the lever arm is in an open position wherein the angle between the lever arm and band is sufficient so that, when the hooked end grasps the margin, the pivot link is away from the socket.

4 Claims, 1 Drawing Sheet

OVERCENTER CLAMP

TECHNICAL FIELD

This invention relates to an overcenter clamp for clamping together two members and, more particularly, to an overcenter clamp having a retaining means for maintaining the clamp in an open position.

BACKGROUND

Overcenter clamps for holding together members are known. Such clamps typically include an band hingedly connected to a lever arm. The band engages one member and the lever arm engages the other member with the hinged connection enabling the band to be tensioned which results in a clamping force being applied to the members. Among the advantages of an overcenter clamp is the relative ease with which it can be attached to the members, the relatively large clamping force it can apply to the members and the relative ease with which it can be opened. Also, an overcenter clamp can usually withstand a repeated number of openings and closings without appreciably fatiguing.

Overcenter clamps are sometimes used to clamp together containers which are assembled in an automated assembly process. One example of such an automated assembly process is the insertion of filter elements into air cleaner housings and clamping the housing members together by means of an overcenter clamp. The hinged connection between each band and lever arm typically allows free rotation of the band with respect to the lever arm about the hinged connection. This free rotation can require a sophisticated automated assembler to grasp the overcenter clamp and apply it to the members. Considerable manipulative ability can be required of the automated assembler to orient the band and lever arm with respect to the members and to connect the band and lever arm to the members.

If the required automated assembler is not available due, for example, to cost, then the overcenter clamp is typically applied by hand even in an otherwise automated assembly process. This can limit the speed and efficiency of the overall assembly process.

SUMMARY OF THE INVENTION

The present invention provides an overcenter clamp comprising a flexible band having an inner side, an outer side, a hinge end and a hooked end. The hooked end faces the inner side and is adapted to grasp a margin of a first member.

The overcenter clamp further comprises a lever arm hingedly connected to the hinge end. The lever arm has a handle facing the outer side and a pivot link facing the inner side. The pivot link has an end adapted for insertion into a socket in a second member. This enables the first and second members to be clamped together by placing them adjacent one another so that the socket is adjacent and parallel to the margin, grasping the margin with the hooked end, inserting the pivot link into the socket, and rotating the handle away from the band to a point wherein the band is tensioned and bears upon the second member.

The overcenter clamp includes a retaining means connected to the band adjacent the hinge end. The retaining means is engageable with the lever arm to resist rotation of the lever arm with respect to the band when the lever arm is in an open position wherein the angle between the lever arm and band is sufficient so that, when the hooked end grasps the margin, the pivot link is away from the socket.

The ability of the retaining means to resist rotation of the lever arm with respect to the band when the lever arm is in the open position facilitates application of the overcenter clamp to the first and second members in an automated assembly process. This is due to the increased capability of an automated assembler, such as a robot, to grasp and manipulate an unattached overcenter clamp wherein rotation between the lever arm and band is resisted with the lever arm in the open position. The resistance to rotation of the band with respect to the lever arm particularly facilitates orientation of the overcenter clamp with respect to the first and second members, and attachment of the band to the first member and the lever arm to the second member by an automated assembler. The speed and efficiency of the overall assembly process is thereby increased.

These and other features and advantages of the invention will be more fully understood from the following description of certain specific embodiments of the invention taken together with the accompanying drawings.

BRIEF DRAWING DESCRIPTION

In the drawings:

FIG. 1 is a view of the overcenter clamp of the present invention in solid lines clamping together the first and second members, and in phantom in the open position; and FIG. 2 is a perspective view of the overcenter clamp of FIG. 1 in the open position.

Corresponding reference characters indicate corresponding parts throughout the several views of the drawings.

DETAILED DESCRIPTION

Figure 1:
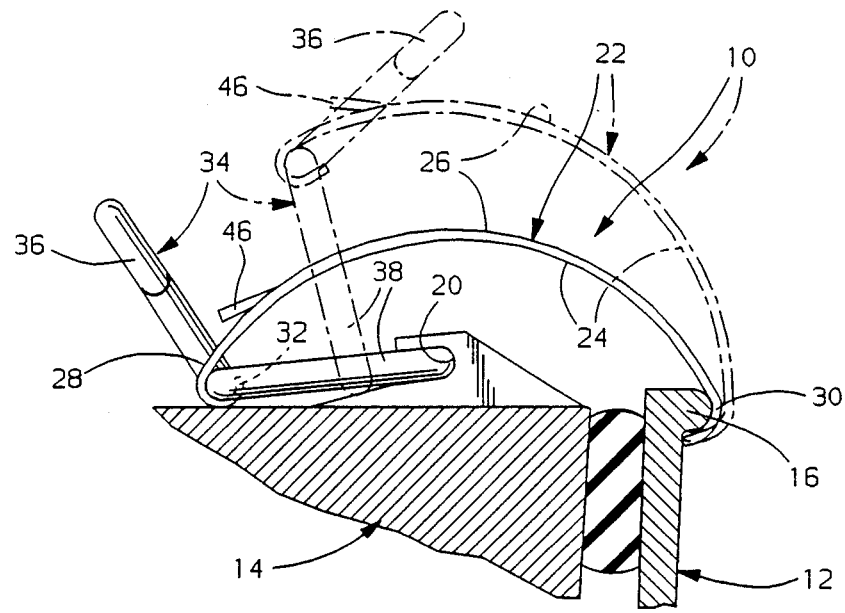

Referring now to the drawings in detail, and in particular, FIG. 1, numeral 10 generally refers to an overcenter clamp of the present invention. The overcenter clamp 10 is shown with a first member 12 having a margin 16 and a second member 14 having a socket 20.

The overcenter clamp 10 comprises a flexible band 22 having a inner side 24, a outer side 26, a hinge end 28, and a hooked end 30. The hooked end 30 faces the inner side 24 and is adapted to grasp the margin 16, as shown in FIG. 1. The band 22 has a pair of sleeves 32 formed in its hinge end 28.

Figure 2:
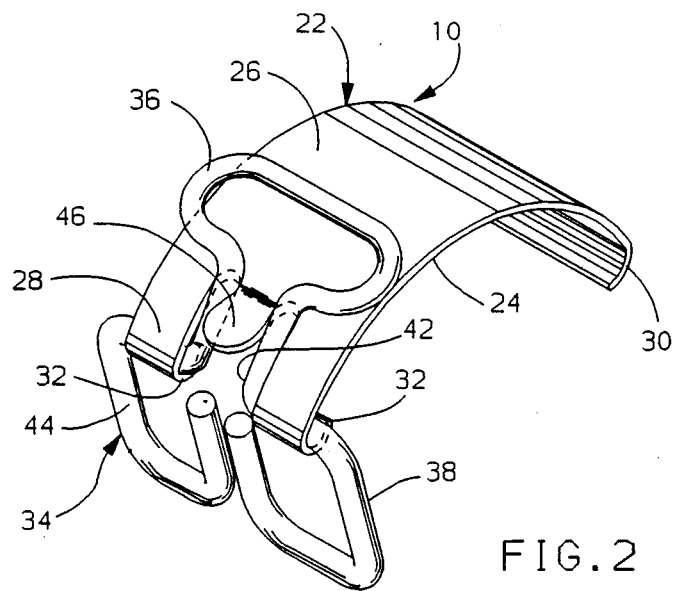

A lever arm 34 is hingedly connected to the hinge end 28. The lever arm 34 has a handle 36 facing the outer side 26 and a pivot link 38 facing the inner side 24. The lever arm 34 may be formed from a continuous rod as shown in FIG. 2 wherein the rod has a T-shaped section which constitutes the handle 36. The handle has an opening 42 adjacent the hinge end 28. The relatively large width of the end of the handle 36 opposite the hinge end 28 provides a large surface for an automated assembler, such as a robot, to grasp.

The pivot link 38 comprises a rectangular section extending from each end of the handle 36, as shown in FIG. 2. The legs of the pivot link 38 adjoining the handle 36 extend through the sleeves 32 to provide the hinged connection. The legs of the pivot link 38 opposite the sleeves 32, constitute the end of the pivot structure and are adapted for insertion into the socket 20. The legs of the pivot link 38 extending toward the hinge end 28 reduce the likelihood of the pivot link becoming entangled with other pivot links since the opening within the pivot link is obstructed and the free ends of the legs of the pivot link are less accessible.

The first and second members 12, 14 are clamped together by first placing them adjacent one another so that the socket 20 is adjacent and parallel to the margin 16. The margin 16 is then grasped with the hooked end 30, and the pivot link 38 is inserted into the socket 20. The handle 36 is then rotated away from the band 22 to a point wherein the band is tensioned and bears upon the second member 14 thereby to clamp the first and second members 12, 14 together. The length of the handle 36 produces leverage which reduces the force required to rotate the handle away from the band 22 to produce the tension therein.

The overcenter clamp 10 further comprises a retaining means including a tab 46 extending from the band 22 adjacent the hinge end 28. The tab 46 extends into the opening 42 when the lever arm 34 is in an open position, as shown in FIG. 1 in phantom and in FIG. 2. When the lever arm 34 is in the open position, the angle between it and the band 22 is sufficient so that, when the hooked end 30 grasps the margin 16, the pivot link 38 is away from the socket 20, as shown in FIG. 1 in phantom. The orientation of the tab 46 on the band 22 reduces interference between the tab and the lever arm 34 when the lever arm 34 rotates toward the second member 14.

The tab 46 is larger than the opening 42, as shown in FIG. 2, and the tab and the handle 36 are constructed of suitable materials, such as resilient metal, to allow insertion of the tab into the opening and to resist removal of the tab therefrom. This resistance to removal of the tab 46 from the opening 42 resists rotation of the lever arm 34 with respect to the band 22 when the lever arm is in the open position.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An overcenter clamp comprising:
   a flexible band having an inner side, an outer side, a hinge end and a hooked end, said hooked end facing said inner side and being adapted to grasp a margin of a first member;
   a lever arm hingedly connected to said hinge end, said lever arm having a handle facing said outer side and a pivot link facing said inner side, said pivot link having an end adapted for insertion into a socket of a second member enabling the first and second members to be clamped together by placing them adjacent one another so that the socket is adjacent and parallel to the margin, grasping the margin with said hooked end, inserting said pivot link into the socket, and rotating said handle away from said band to a point wherein said band is tensioned and bears upon the second member; and
   a retaining means connected to said band adjacent said hinge end, said retaining means being engageable with said lever arm to resist rotation of said lever arm with respect to said band when said lever arm is in an open position wherein the angle between said lever arm and band is sufficient so that, when said hooked end grasps the margin, said pivot link is away from the socket.

2. The overcenter clamp as set forth in claim 1 wherein said retaining means comprises an opening in said handle adjacent said hinge end and a tab extending from said band so that said tab extends into said opening when said lever arm is in said open position, said tab being larger than said opening, and said tab and said handle being constructed of suitable materials to enable insertion of said tab into said opening and resist removal of said tab therefrom, thereby to resist said rotation of said lever arm with respect to said band.

3. An overcenter clamp assembly comprising:
   a first member having a margin;
   a second member having a socket; and
   an overcenter clamp comprising
   a flexible band having an inner side, an outer side, a hinge end and a hooked end, said hooked end facing said inner side and being adapted to grasp said margin,
   a lever arm hingedly connected to said hinge end, said lever arm having a handle facing said outer side and a pivot link facing said inner side, said pivot link having an end adapted for insertion into said socket enabling the first and second members to be clamped together by placing them adjacent one another so that said socket is adjacent and parallel to said margin, grasping said margin with said hooked end, inserting said pivot link into said socket, and rotating said handle away from said band to a point wherein said band is tensioned and bears upon said second member, and
   a retaining means connected to said band adjacent said hinge end, said retaining means being engageable with said lever arm to resist rotation of said lever arm with respect to said band when said lever arm is in an open position wherein the angle between said lever arm and band is sufficient so that, when said hooked end grasps said margin, said pivot link is away from said socket.

4. The overcenter clamp assembly as set forth in claim 3 wherein said retaining means comprises an opening in said handle adjacent said hinge end and a tab extending from said band so that said tab extends into said opening when said lever arm is in said open position, said tab being larger than said opening, and said tab and said handle being constructed of suitable materials to enable insertion of said tab into said opening and resist removal of said tab therefrom, thereby to resist said rotation of said lever arm with respect to said band.

* * * * *